Feb. 21, 1967   D. R. SABRE   3,304,878
MOTION TRANSMITTING MEANS
Filed Oct. 22, 1965   5 Sheets-Sheet 3
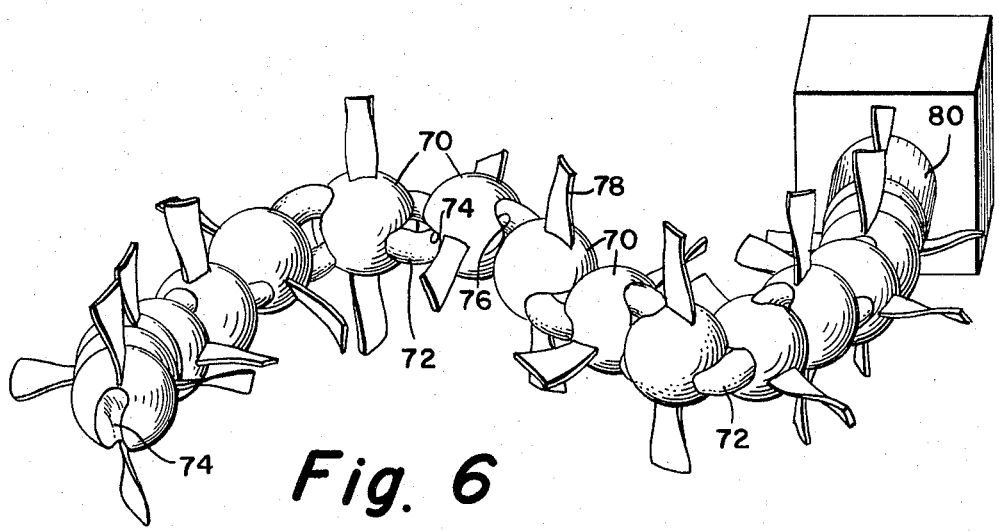
Fig. 6
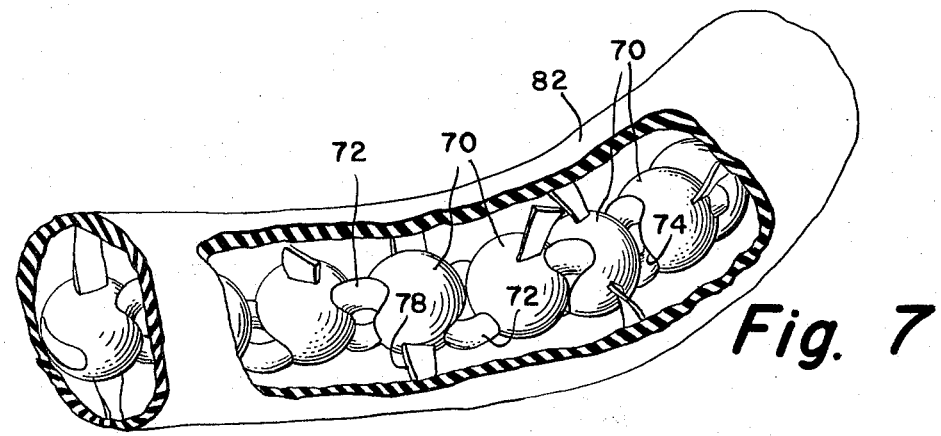
Fig. 7
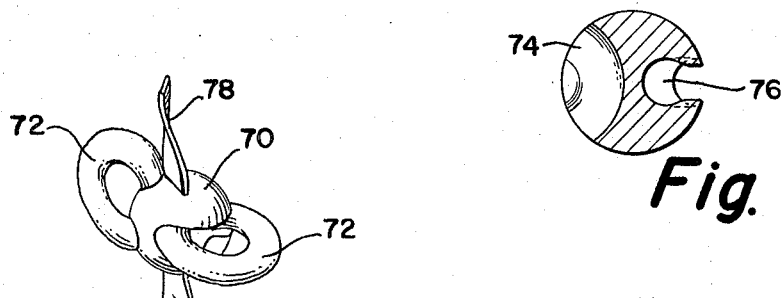
Fig. 8
Fig. 8A
INVENTOR.
*Daniel R. Sabre*
BY
*Busser, Smith + Harding*
ATTORNEYS

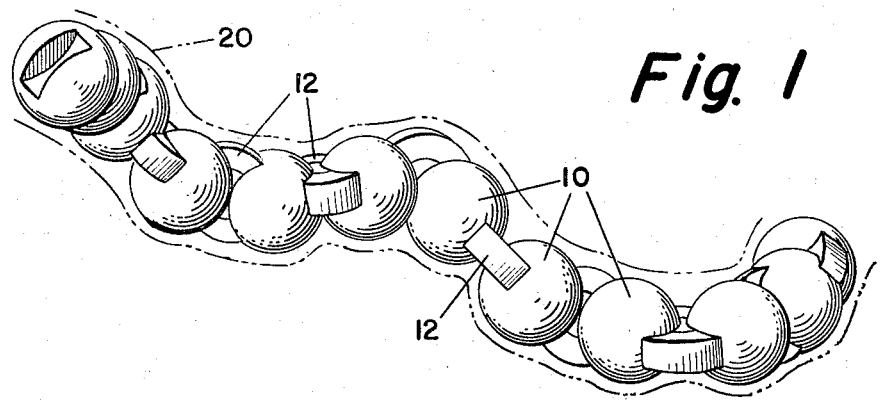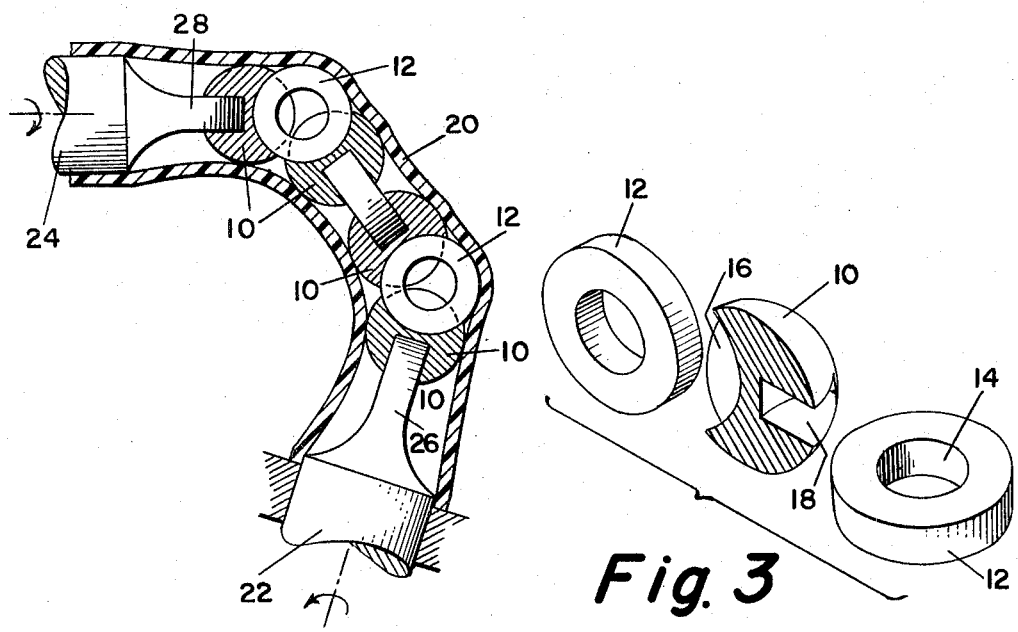

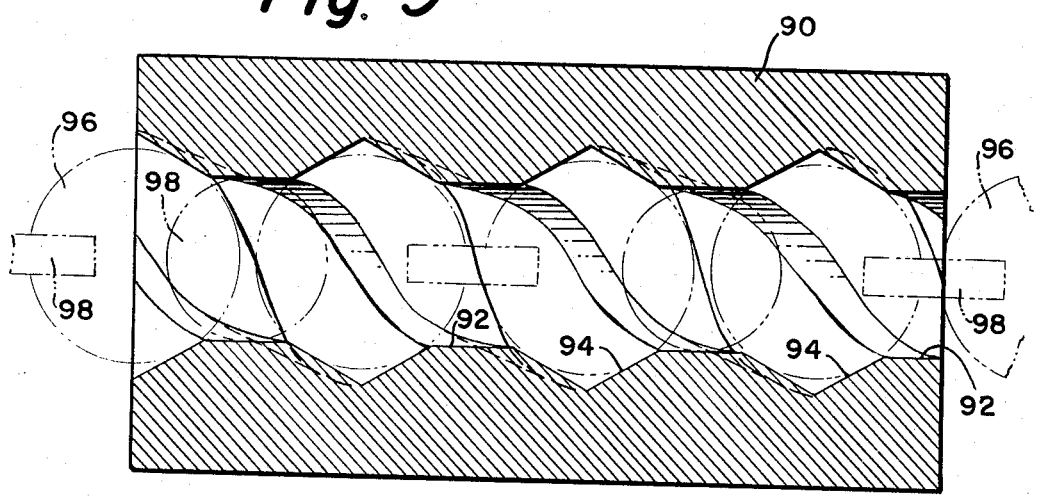
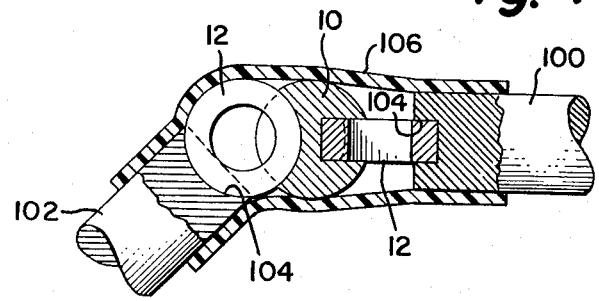
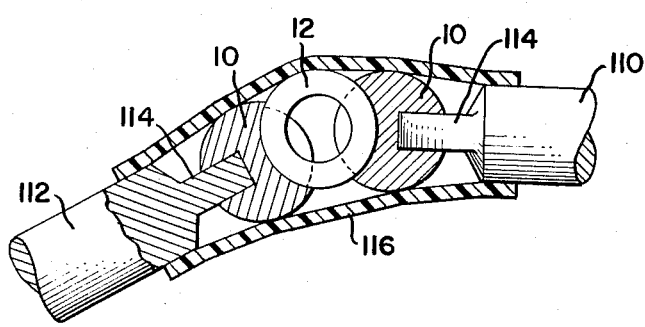

Feb. 21, 1967  D. R. SABRE  3,304,878
MOTION TRANSMITTING MEANS
Filed Oct. 22, 1965  5 Sheets-Sheet 5
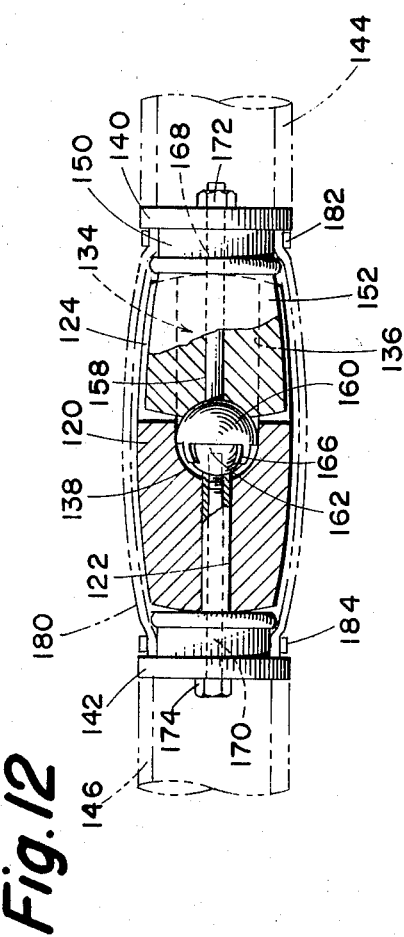
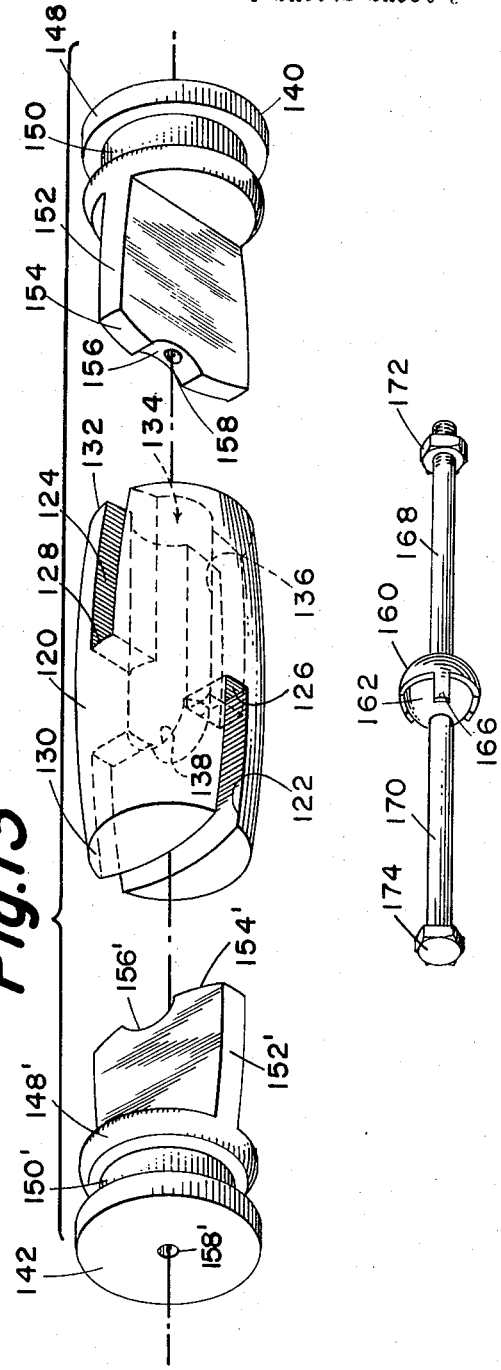
INVENTOR:
DANIEL R. SABRE
BY: Busser, Smith & Harding
ATTORNEY 3,304,878
MOTION TRANSMITTING MEANS
Daniel R. Sabre, 560 Bryn Mawr Ave.,
Bryn Mawr, Pa. 19010
Filed Oct. 22, 1965, Ser. No. 507,612
30 Claims. (Cl. 103—93)

This is a continuation-in-part of my copending application Serial No. 345,033, filed February 14, 1964, now abandoned.

This invention relates to motion transmitting means of type having application in various arts. By ways of example, the broad aspects of the motion transmitting means in accordance with this invention may be embodied in a universal joint, a flexible shaft, a pump, a lead screw, a remote control mechanism, and a flexible cable capable of transmitting longitudinal movement in either direction.

A broad object of this invention is to provide a motion transmitting means involving the transmission of rotary-to-rotary motion with a substantial permissible range of deviation of the angular relation between the input and output axis.

Another object of this invention is to provide a motion transmitting means of the indicated type wherein there is a minimum of lost motion or backlash.

Another object of this invention is to provide a motion transmitting means which has the flexibility of a cable and which can transmit motion along the length thereof in either direction, such a motion transmitting means being, in effect, the inverse of a cable or rope.

Another object of this invention is to provide a pump comprising a rotary-to-rotary motion transmitting means in accordance with this invention wherefore the pump may have a curved construction and may operate over great lengths.

Another object of this invention is to provide a motion transmitting means for transmitting rotary movement to linear movement with a series of units in accordance with this invention.

The above and other objects and features of the invention will become apparent from the following description when read in conjunction with the accompanying drawings, in which:

FIGURE 1 is a perspective view of a motion transmitting means in accordance with this invention;

FIGURE 2 is a sectional view of a motion transmitting means in accordance with this invention for the transmission of rotary-to-rotary motion;

FIGURE 3 is an exploded perspective view of the units comprising the motion transmitting means in accordance with this invention;

FIGURE 6 is a perspective view of still another form of the invention;

FIGURE 7 is a perspective view, with parts thereof being broken away, of a pumping arrangement in accordance with this invention;

FIGURE 8 is a perspective view of a unit employed in the embodiment of the invention shown in FIGURE 7;

FIGURE 8A is a sectional view of one of the units shown in FIGURE 8;

FIGURE 9 is a sectional view of still another form of the invention;

FIGURES 10 and 11 are sectional views of universal joints comprising the motion transmitting means in accordance with this invention; and FIGURES 12 and 13 are views of another form of universal joint or coupling embodying the principles of the invention.

Figure 4:
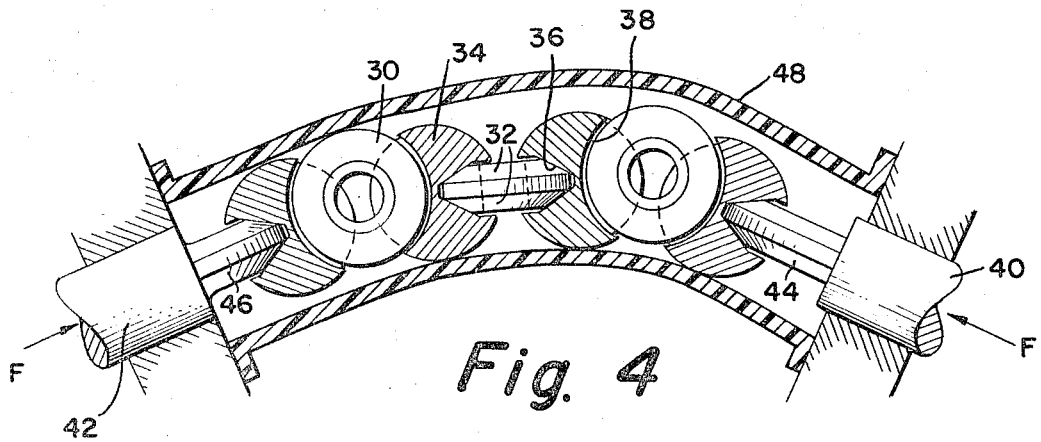
FIGURE 4 is a sectional view of another form of the invention.

Referring to FIGURES 1 to 3, the motion transmitting means in accordance with this invention comprises a series of engaging ball-like members 10 and flat circular or disc-like members 12 arrange alternately throughout the axial length of the motion transmitting means. In this form of the invention the members 12 are annular flat cylinders provided with a central opening 14 and the members 10 are spheres having a pair of cavities or grooves 16 and 18 therein. Each of the grooves 16 and 18 is shaped to conform to the shape of the members 12 for receiving the same, the fit of the members 12 in grooves 16 and 18 being as close as desired for a particular application. However, it is essential that sliding movement is possible between the mating surfaces. Members 12 are received in cavities 16 and 18 for movement therein relative to member 10. This relative movement is limited to the plane of the cavities and to the confines of the cavities since the curved construction limits lateral movement. Of course, by reason of the engaging arrangement the members 10 and 12 transmit rotary movement to one another. Grooves 16 and 18 are located in opposite ends of a diameter or axis of spherical member 10 and in perpendicular planes extending along an axis of member 10 as is apparent in FIGURES 1 to 3.

By way of illustration, the grooves 16 and 18 may be cut in a member 10 by a tool having the same shape as a member 12, but having a slightly larger width. The grooves may be formed by a tool having a larger diameter than the disc-like member but it is important that there be sufficient curvature in the curve portion of the groove to limit lateral movement of the member 12 out of the grooves.

The motion transmitting means comprises a tubular sheath 20 for containing the members 10 and 12. As is shown in FIGURE 2, the sheath 20 extends between the input shaft 22 and the output shaft 24 with the members 10 and 12 contained therein. In FIGURE 1, the sheath is represented by dotted lines to avoid obscuring the disclosure of the motion transmitting means. Preferably, the sheath is made of a flexible material and must have sufficient strength to hold the members 10 and 12 in the motion transmitting relation. Various suitable plastics, such as polyvinyl chloride may be used for the sheath. In addition to containing the members in engaging relation, the sheath serves to provide an enclosure into which lubricant may be placed for lubricating the mating surfaces of the members 10 and 12. Preferably, the sheath is mounted for rotation with the members, however in some installations, such as where the deviation is fixed, the sheath may be mounted in a fixed position.

The motion transmitting means shown in FIGURE 1 comprises a large number of the members 10 and 12 in the form of an elongated chain or cable and illustrates the flexibility of the motion transmitting means in accordance with this invention. The arrangement shown in FIGURE 1 is almost as flexible as a conventional link chain and can transmit rotary movement between a pair of shafts by way of a path having deviations in many directions. This arrangement is particularly suitable for application in remote control mechanisms.

The arrangement shown in FIGURE 2 demonstrates the amount of deviation possible between the input and output shaft axes. In this figure, it can be seen that the deviation between the axis of the input shaft 22 and the output shaft 24 is greater than 90°. It will be apparent that the limit of the deviation depends on the size of the parts and the spacing between the shafts.

With respect to FIGURE 2, it is noted that the input and output shafts 22 and 24 have formed on their ends projections 26 and 28, respectively. The ends of the projections are rounded in a form similar to the shape of the disc-like members 12 for reception in the cavities of the members 10 at the ends of the flexible shaft arrangement. It will be apparent that other arrangements may be used for connecting the input and output shafts to the motion transmitting members. For example, the shafts may have grooves therein for the reception of disc members 12 on the ends of the motion transmitting means. This arrangement is illustrated by the universal joint shown in FIGURE 10.

In operation, as the input shaft 22 is rotated, the motion transmitting means flexes to accommodate the effect of the deviation between the axes of the input and output shafts in a manner similar to flexible shaft connections. This flexure is possible by reason of a relative movement between the members 10 and 12 which movement involves a turning or rotating action of the disc-like members within their cooperating grooves and in the planes of said grooves relative to the corresponding ball members. This turning action is repeated for each revolution of the mechanism and varies in amount in accordance with the amount of deviation between the input and output shaft axes. If these axes are in alignment there will be no relative turning movement. However, as the deviation increases, there is an increase in the relative turning movement. For each unit comprising a ball and a pair of disc-like members the slots 16 and 18 permit relative movement in perpendicular planes.

It will be apparent that if it is desired to avoid any problem of lost motion or backlash in the mechanism, the grooves in member 10 and the members 12 may be made with extreme accuracy to provide a close fit. However, another way to avoid this problem is illustrated in FIGURES 4 and 5.

Figure 5:
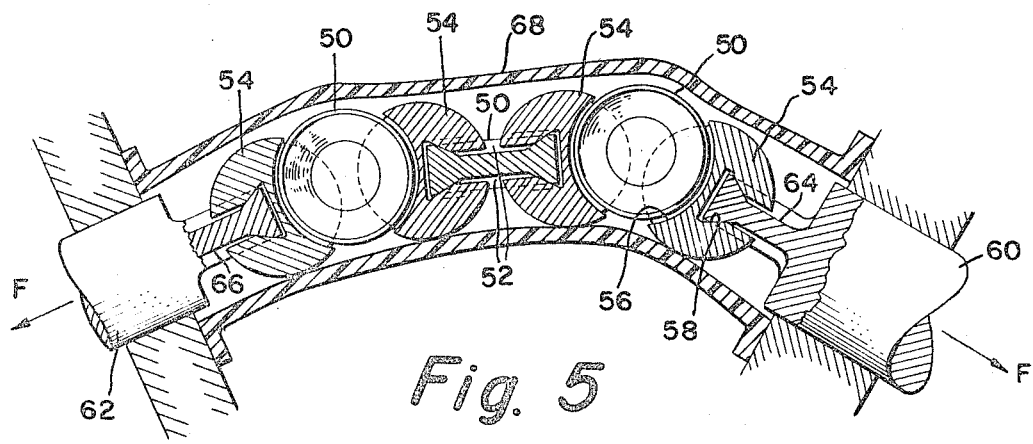
FIGURE 5 is a sectional view of still another form of the invention.

In the motion transmitting means shown in FIGURE 4, which is generally similar to that shown in FIGURE 2, there are provided annular disc-shaped members 30 which are tapered on both sides to form annular tapered faces 32 converging toward the periphery of member 30. There are also provided ball-like members 34 which have cavities 36 and 38 arranged in perpendicular planes as described with respect to FIGURE 2 and having a tapered construction to accommodate the tapered faces 32 of member 30. The cavities 36 and 38 may be made from a circular tool having a shape similar to the members 30.

The members 30 and 34 are arranged alternately as shown in FIGURE 4 with a ball member at each end thereof. An input shaft 40 and an output shaft 42 are provided with projections 44 and 46, respectively, having round tapered ends for engagement with the tapered cavities of the ball members at the ends of the motion transmitting means.

In order to achieve a tight fit between the mating surfaces of members 30 and 34, the shafts are mounted in compression as is shown by the arrows in FIGURE 4 representing the compression force F. This compression mounting provides a tight fit between the mating tapered portions of the members 30 and 34 to eliminate any backlash or lost motion. However, the members 30 and 34 may still turn relative to each other in the plane of the cooperating cavities and members in the manner described with respect to the form of the invention shown in FIGURE 2. A sheath 48 is provided to contain the members 30 and 34 and to provide an enclosure for lubrication as was discussed above.

The motion transmitting means shown in FIGURE 5, which is generally similar to that shown in FIGURE 2, comprises annular disc-shaped members 50 having dish-shaped upper and lower faces 52 which define an annular tapered portion extending around the periphery of this member. The taper diverges toward the periphery of member 50. There are also provided ball-like members 54 which have cavities 56 and 58 arranged in perpendicular planes as described with respect to FIGURE 2 and having a tapered construction to accommodate the tapered faces 52 of member 50. The cavities may be made by forming a groove in the member 54 and after a member 40 is positioned therein, swaging member 54 thereover.

The members 50 and 54 are arranged alternately as shown in FIGURE 5 with a ball member at each end thereof. An input shaft 60 and an output shaft 62 are provided with projections 64 and 66, respectively, having round tapered ends similar to the members 50 for engagement with the tapered cavities of the end ball members.

In order to achieve a tight fit between the mating surfaces of members 50 and 54, the shafts 60 and 62 are mounted in tension as shown by the arrows in FIGURE 5 representing the tension force F. This arrangement eliminates backlash or lost motion between members 50 and 54. However, the members 50 and 54 may still turn relative to each other in the plane of the cooperating cavities and members in order to accommodate the flexible movement of the mechanism. A sheath 68 is provided to contain the members 50 and 54 and to provide an enclosure for lubrication. However, since the members 50 and 54 are held in interlocking engagement by reason of the diverging tapered construction, the sheath may be eliminated if desired.

FIGURE 6 illustrates a fluid stirring mechanism comprising the motion transmitting means in accordance with this invention. This mechanism is comprised of alternately arranged engaging ball members 70 and ring members 72. Each of the ball members 70 has a pair of perpendicularly arranged cavities 74 and 76 adapted to receive and hold a ring member 72. The cavities are made by forming a groove in the ball member 70 and, after a ring member 72 is inserted in this groove, swaging the ball member 70 over the ring member 72. Each of the ball members 70 is provided with a pair of radially extending vanes 78. As shown in FIGURE 6, adjacent ball members 70 are arranged so that their vanes 78 extend in perpendicular relation. One end of the stirring mchanism is connected to a drive means 80 from which the assembly extends into the container wherein the fluid is to be stirred. Of course, any suitable drive means may be used.

In operation, as the one end of the assembly is rotated the entire length thereof will also rotate, and in the fashion of a flexible cable will wiggle in all directions to provide a very effective stirring action. It will be apparent that the stirring chain may be supported in various predetermined configurations and provided with bearings at spaced locations as desired.

In FIGURE 7 there is illustrated a pump means comprising a vaned arrangement similar to that shown in FIGURE 6. In order to provide a pumping action, the vaned mechanism is placed within a tubing 82, which may be flexible, and the vanes 78 are constructed in accordance with pump design techniques. Accordingly, by rotating the vanes arrangement, fluid can be pumped through the tubing 82, the pumping action being of a non-positive type. A feature of this arrangement is that the pump may take a curved configuration.

FIGURE 9 illustrates the application of the invention to the transmission of rotary-to-linear motion. In this form of the invention there is provided a block member 90 having a central bore 92 provided with an internal helical groove 94. The block member 90 is adapted to receive an arrangement similar to the motion transmitting means described hereinbefore and this means is illustrated in dashed lines in FIGURE 9. This means comprises alternately arranged ball members 96 and disc members 98, the disc members having a smaller diameter than the ball members. The diameter of the disc members 98 is such that they will pass through the central bore 92 in the block. The helical groove 94 in the block member 90 is V-shaped and makes several convolutions. As shown in FIGURE 9, the helical groove is adapted to receive the ball members of the motion transmitting means. It will be apparent that in operation relative axial movement between the block member 90 and the motion transmitting means may be achieved by rotating either the block or the motion transmitting means. If the block is rotated while being maintained in a fixed axial position, such as by thrust bearings on each end, with the motion transmitting means being held against rotation by any suitable means, the motion transmitting means will be moved longitudinally. Also, if the motion transmitting means is rotated by any suitable drive means, with the block being held stationary so that it does not rotate or move longitudinally (by any suitable means), the motion transmitting means will be moved in a longitudinal direction. The many applications of this embodiment of the invention will be apparent to those skilled in the art. For example, this arrangement may be used as a lead screw. Also, the arrangement may be used to drive a flexible cable of the type disclosed, which cable can be moved in a longitudinal path, either linear or curved, as desired. In fact, the practical limit of deviation is a complete turn of 360°. It will be apparent that the number of units to achieve a deviation of 360° depends upon the size of the individual units.

FIGURE 10 illustrates a universal joint constructed in accordance with this invention. The joint comprises ball members 10 and annular disc member 12 such as those described in connection with FIGURES 1 to 3 wherefore like reference numerals have been used. The joint is connected between a drive shaft 100 and a driven shaft 102 and comprises a pair of disc members 12 engaging an intermediate ball member 10 and received within grooves 104 in the ends of the shafts 100 and 102. A sheath 106 extends between the shafts 100 and 102 and encloses the joint members.

FIGURE 11 illustrates another universal joint constructed in accordance with this invention. The joint comprises ball members 10 and annular disc member 12 such as those described in connection with FIGURES 1 to 3 wherefore like reference numerals have been used. The joint comprises a pair of ball members 10 and an intermediate disc member 12 mounted between a drive shaft 110 and a driven shaft 112. The grooves in the ball members 10 receive the intermidate disc 12 and rounded ends 114 on the shafts 110 and 112. A sheath 116 extends between the shafts and encloses the joint members.

It will be apparent that the universal joints shown in FIGURES 10 and 11 comprise a very simple construction having high strength characteristics. Moreover, the joints permit a universal connection between the shafts permitting a very large deviation.

FIGURES 12 and 13 illustrate a universal-type coupling constructed in accordance with the invention. The coupling disclosed is particularly useful as a universal joint for the drive of an automobile although it obviously will have broader application in various rotary-to-rotary drives. The coupling comprises a generally cylindrical member 120 provided with a pair of cavities or grooves 122 and 124 in the ends thereof. The grooves 122 aand 124 are located to extend in planes perpendicular to one another and along a diameter of the cylindrical member 120 to provide open outer and side ends. The grooves 122 and 124 have opposed parallel sides and terminate at flat bottoms 126 and 128, respectively. The ends of member 120 are also rounded and are indicated at 130 and 132. Member 120 is also provided with an axial bore indicated generally at 134 and extending inwardly from the end 132. The bore 134 has a cylindrical portion 136 extending inwardly from end 132 and a hemispherical portion 138 at the innermost end of the bore. The purpose of this bore construction will appear hereafter.

The coupling comprises a pair of drive members 140 and 142 which are secured to shafts 144 and 146, respectively, which, for purposes of illustration, may be termed the drive and driven shafts, respectively. Obviously, the drive and driven shafts may be reversed. Drive member 140 has a cylindrical portion 148 provided with an external annular recess 150, and a flat-sided extension 152 projecting axially and perpendicularly from the cylindrical portion 148. The outer end 154 of the extension 152 is rounded as provided with a circular recess 156 at a central location. The drive member 140 is provided with an axial bore 158 extending longitudinally therethrough.

Drive member 142 is constructed in a manner similar to drive member 140 and has a cylindrical portion 148′ provided with an external annular recess 150′, and a flat-sided extension 152′ projecting axially and perpendicularly from a cylindrical portion 148′. The outer end 154′ of extension 152′ is rounded and is provided with a circular recess 156′ at a central location. The drive member 142 is also provided with an axial bore 158′ extending longitudinally therethrough.

In the assembled condition of the coupling, the straight-sided extensions 152 and 152′ are located within the straight-sided grooves 124 and 122, respectively. The fit of the extensions within the grooves is preferably a relatively tight fit to avoid lost motion. However, the fit must be such as to permit relative sliding movement between the opposed sides of the extensions and the grooves. It will be noted that the relative sliding movement between extension 152 within groove 124 and extension 152′ within groove 122 is limited to the central planes of the grooves which are perpendicular to each other. Thus, drive member 140 is confined to movement in a plane perpendicular to drive member 142.

Means are provided to hold the drive members 140 and 142 together against axial movement and to provide a central point of articulation for pivotal movement for the drive members 140 and 142 in their confined planes. Such means comprises a socket member 160 and a ball 162 contained within a spherical cavity 164 within the socket member 160. The ball 162 is held within the socket member 160 against separation by four fingers 166 which extend around the circumference of the ball 162 to couple the same within the socket member 160. The socket member 160 has a rod 168 secured on the outside thereof at a central location and extending radially therefrom. The outer end of the rod 168 is threaded for engagement by a nut 172 for a purpose which will appear hereafter. The ball 162 is provided with a radially extending threaded bore 171 adapted for threaded engagement by the externally threaded inner end of a rod 170 which carries a bolthead 174 at its outermost end. An alternate mounting for ball and socket on the member 140 may involve simply welding socket member 160 onto the end 154 thereby eliminating rod 168 and nut 172.

In order to place the coupling in the assembled condition shown in FIGURE 12, it is first necessary to mount the ball and socket arrangement on the drive member 140. This is achieved by sliding the rod 168 through the bore 158 from the inner end of drive member 140 so that the threaded end of rod 168 projects from the outer end of member 140 for engagement by the nut 172. In assembling the parts, the nut 172 is threaded onto the rod 168 so as to place the socket 160 into contact with the curved recess 156 and fixedly secure the parts together. The assembly comprising the ball and socket means and the drive member 140 is then slid into the cavities of member 120 from the right end with the extension 152 being slid into the groove 124. It will be apparent that the bore 134 is constructed to receive the ball and socket means during this assembling operation. The member 140 is positioned within member 120 with the ball and socket means being located within the hemispherical portion 138 of bore 134, as is best shown in FIGURE 12.

The next step in the assembly procedure is to insert the rod 170 into the bore 158 from the outer end of drive member 142 and to slide the drive member 142 into the groove 122. The threaded end of rod 170 is then engaged within the threaded bore 171 in ball 162. The rod being adjusted so that the bolthead 174 which engages the outer end of member 142 moves member 142 inwardly until the curved recess 156' contacts the ball 162 as is shown in FIGURE 12. It will be evident that during this assembly procedure care should be taken so that the end 154' of the drive member 142 is located between the spaced fingers 166 which provide suitable clearance for member 142. It will thus be apparent that by following the above procedure all the parts of the coupling are secured together against any axial separating movement.

A cylindrical boot 180, which may be of a suitable flexible and durable plastic, is positioned on the coupling to extend between the cylindrical portions 148 and 148' of members 140 and 142 so as to enclose the member 120 and the parts positioned therein. A suitable lubricant is deposited within the boot 180 to provide the necessary lubrication for the various moving parts. The ends of the boot 180 are secured within the annular recesses 150 and 150' by means of retaining rings 182 and 184. In this manner the boot 180 keeps dirt and other foreign matter out of coupling.

The assembled coupling is now secured to the shafts 144 and 146 as by welding or any other suitable securing operation.

In operation, as the drive shaft 144 is rotated the drive member 140 is also rotated and transmits its movement by way of extension 152 to the member 120. Member 120 by reason of its engagement with extension 152' transmits the rotary movement to the drive member 142 which, in turn, transmits the rotary movement to the shaft 146. It will be apparent that the coupling permits a certain amount of deviation between the axes of the shafts 144 and 146 by reason of the coupling arrangement in accordance with the invention. Thus, the member 144 can pivot about a center of articulation which is located at the center of the ball and socket means, this movement being limited to the plane provided by the cavity 124. Also, the shaft 146 may pivot with the drive member 142 about the same center, this movement being confined to the plane of the groove 122. It will thus be evident that the drive members 140 and 142 articulate about the same central point of the coupling and, since this articulation is in perpendicular planes, a universal-type coupling is provided. It will be noted that by reason of this type of coupling any deviation of the axis of the shafts 144 and 146 will be accommodated by the coupling during rotation.

From the foregoing description it will be apparent that the broad aspects of the invention have a wide range of utility. Moreover, the mechanism can be constructed easily and inexpensively by reason of the simple construction of the individual parts. Furthermore, it will be obvious that the mechanism is constructed to transmit very high loads, of either linear or torsion type.

It will be apparent that changes may be made in the construction and arrangement of parts without departing from the scope of the invention. Accordingly, it is not desired to be limited except as set forth by the following claims.

What is claimed is:

1. A motion transmitting means for the transmission of rotary motion comprising a pair of shafts, a plurality of first members, and a plurality of second members having a periphery defining a circle and an annular tapered portion converging toward the periphery thereof, said first and second members being alternately arranged in engagement with each other for the transmission of rotary motion therebetween and extending between the shafts, the outer members being in driving engagement with the corresponding shaft, each of said first members having a pair of cavities in opposed peripheral portions thereof, each of said cavities extending in a plane perpendicular to the plane of the other cavity and along an axis of said first member, each second member between a pair of first members having its annular portion received in a cavity in each of said pair of members for relative movement therein with respect to said first members, said cavities having a tapered configuration conforming to and mating with said taper of said second members, said cavities of said first members and said second members providing contacting wall cooperating to confine the movement of said second members relative to said first members in the planes of said cavities and to guide said second members for unlimited rotational movement so that the entire circumference of each of said second members is movable through a cavity receiving the same, said shafts being maintained under axial compression to minimize backlash between said members.

2. A motion transmitting means according to claim 1 comprising a tubular sheath containing said first and second members and extending between said pair of shafts.

3. A motion transmitting means for the transmission of rotary motion comprising a pair of shafts, a plurality of first members, and a plurality of second members having an annular tapered portion diverging toward the periphery, said first and second members being alternately arranged in engagement with each other for the transmission of rotary motion therebetween the extending between the shafts, the outer members being in driving engagement with the corresponding shaft, each of said first members having a pair of cavities in opposed peripheral portions thereof, each of said cavities extending in a plane perpendicular to the plane of the other cavity and along an axis of said first member, each second member between a pair of first members having its annular portion received in a cavity in each of said pair of members for relative movement therein with respect to said first member, said cavities having a tapered configuration conforming to and mating with said taper of said second members, said shafts being maintained under axial tension to minimize backlash between said members.

4. A motion transmitting means according to claim 3 comprising a tubular sheath containing said first and second members and extending between said pair of shafts.

5. Fluid stirring apparatus comprising a flexible cable including a plurality of first members, and a plurality of second members, said first and second members being alternately arranged in engagement with each other for the transmission of rotary motion therebetween, each of said first members having a pair of cavities in opposed peripheral portions, each of said cavities extending in a plane perpendicular to the plane of the other cavity and along an axis of said first member, each second member between a pair of first members being received in a cavity in each of said pair of members for relative movement therein with respect to said first members, a plurality of said first members having at least one vane extending radially from said cable, and rotatable means engaging one end of said cable for rotating the same.

6. Fluid stirring apparatus comprising a flexible cable including a plurality of first members, and a plurality of second members, said first and second members being alternately arranged in interlocking engagement with each other for the transmission of rotary motion therebetween, each of said first members having a pair of cavities in opposed peripheral portions, each of said cavities extending in a plane perpendicular to the plane of the other cavity and along an axis of said first member, each second member between a pair of first members being received in a cavity in each of said pair of members for relative movement therein with respect to said first member, a plurality of said first members having a plurality of vanes extending radially from said cable, and means engaging one end of said cable for rotating the same.

7. A pump comprising a tubular member for containing liquid to be pumped, and an elongated pumping means extending longitudinally through said tubular member for pumping liquid therethrough, said pumping means including a plurality of first members, and a plurality of second members, said first and second members being alternately arranged in engagement with each other for the transmission of rotary motion therebetween, each of said first members having a pair of cavities in opposed peripheral portions, each of said cavities extending in a plane perpendicular to the plane of the other cavity and along an axis of said first member, each second member between a pair of first members being received in a cavity in each of said pair of members for relative movement therein with respect to said first members, a plurality of said first members having vane means extending radially of the tubular member axis for impelling liquid therein longitudinally upon rotation of said pumping means.

8. A pump according to claim 7 wherein each of said vane means comprises two diametrically opposed vanes extending radially from said first members.

9. A universal joint for the transmission of rotary motion between a driving element and a driven element comprising a first member in engagement with the driving element for rotation therewith, a second member in engagement with the driven element for rotation therewith, said first and second members having a periphery defining a circle, an intermediate member in engagement with said first and second members for transmitting rotary movement therebetween, said intermediate member having a pair of cavities in opposed peripheral portions thereof, each of said cavities extending in a plane perpendicular to the plane of the other cavity and along an axis of said intermediate member, said first and second members being received in a cavity of said intermediate member for relative movement therein with respect to said intermediate member and for transmitting rotary movement between said members, said cavities and said first and second members providing contacting walls cooperating to confine the movement of said first and second members relative to said intermediate member to movement in said planes of said cavities and to permit unlimited rotational movement of said first and second members about their central axis of rotation so that said first and second members are movable throughout a complete revolution, means defining a cavity in the driving element in opposed relation to the cavity in said intermediate member containing said first member and in a plane parallel to said cavity, said first member being received in said cavity in said driving element for relative movement therein, means defining a cavity in the driven element in opposed relation to the cavity in said intermediate member containing said second member and in a plane parallel to said cavity, said second member being received in said cavity in said driven element for relative movement therein, and a tubular sheath extending between the driving and driven elements to enclose said members.

10. A universal joint according to claim 9 wherein said first and second members have a generally flat shape, each of said cavities in said intermediate member and in said driving and driven elements having a pair of spaced walls and a concave bottom having a radius of curvature substantially the same as that of said circular periphery of said first and second members cooperating therewith, said cavity bottoms conforming closely to the cooperating peripheries.

11. A universal joint for the transmission of rotary motion between a driving element and a driven element comprising a first member in engagement with the driving element for rotation therewith, a second member in engagement with the driven element for rotation therewith, an intermediate member in engagement with said first and second members for transmitting rotary movement therebetween, each of said first and second members having a pair of cavities in opposed peripheral portions thereof, each of said pair of cavities extending in a plane perpendicular to the plane of the other cavity of said pair and along an axis of the corresponding member, said intermediate member having a disc-like shape with a periphery defining a circle and being received in a cavity of each of said first and second members for relative movement therein with respect thereto and for transmitting rotary movement between said members, said cavities receiving said intermediate member and said intermediate member providing contacting walls cooperating to confine the movement of said intermediate member relative to said first and second members to movement in said planes of said receiving cavities and to permit unlimited rotational movement of said intermediate member about its central axis of rotation so that said intermediate member is movable throughout a complete revolution, and a tubular sheath extending between the driving and driven elements to enclose said members.

12. A universal joint according to claim 11 comprising means interconnecting said first member and the driving element including a member secured to the driving element and received in a cavity of said first member for relative movement therein, and means interconnecting said second member and the driven element including a member secured to the driven element and received in a cavity of said second member for relative movement therein.

13. A universal joint according to claim 12 wherein said first and second members have a ball-like configuration and said cavities therein receiving said intermediate member having a pair of spaced walls and a concave bottom having a radius of curvature substantially the same as that of said circular periphery of said intermediate member.

14. A motion transmitting means for transmitting rotary to linear motion comprising a flexible cable including a plurality of first members having a ball-like configuration, and a plurality of second members, said members being alternately arranged in engagement with each other for the transmission of rotary motion therebetween, each of said first members having a pair of cavities in opposed peripheral portions thereof, each of said pair of cavities extending in a plane perpendicular to the plane of the other cavity of said pair and along an axis of said first member, each second member between a pair of first members being received in a cavity in each of said pair of first members for relative movement therein in said planes of said cavities, said first members being arranged with the cavities of adjacent first members in opposed relation and lying in the same plane, and a block member having a bore through which said flexible cable extends and a helical internal groove in said bore adapted to receive said ball members in thread-like engagement whereby relative rotational movement between said block member and said cable is transmitted into longitudinal movement therebetween.

15. A motion transmitting means according to claim 14 wherein said second members have a generally circular periphery, said cavities in said first members are shaped to conform approximately to the shape of said second members, said first members having a larger diameter than said second members, and said bore has a diameter larger than that of said second members.

16. A universal-type coupling for transmitting rotary movement between a pair of rotatable coupling elements comprising a first member in driving engagement with one of the coupling elements for rotation therewith, a second member in driving engagement with the other of said coupling elements for rotation therewith, an intermediate member in engagement with said first and second members for transmitting rotary movement therebetween, said intermediate member having a pair of cavities in opposed peripheral portions, the central planes of each of said cavities being perpendicular to one another, said first member being received in one of said cavities of said intermediate member for relative movement therein with respect to said intermediate member along said plane of said cavity and for transmitting rotary movement between said first member and said intermediate member, said second member being received in the other of said cavities of said intermediate member for relative movement therein with respect to said intermediate member along said plane of said cavity and for transmitting rotary movement between said second member and said intermediate member, and means secured to said first member and to said second member for holding the same against relative movement in an axial direction and for pivotally mounting said members for rotatable movement relative to one another, said rotatable movement of said first and second members being confined by said cavities.

17. A coupling according to claim 16 wherein said securing and pivoting means for said first and second members comprises a ball and socket means including a ball member rotatable within and coupled to a socket member whereby said ball and socket members pivot relative to each other about a central point, means securing said first member to said ball member for conjoint movement, and means securing said second member to said socket member for conjoint movement.

18. A coupling according to claim 17 wherein said intermediate member has a cavity receiving said ball and socket means, said last-named cavity being located to extend between said perpendicular cavities.

19. A coupling according to claim 17 comprising a generally cylindrical boot enclosing said intermediate member and the relatively moving parts therein to provide an enclosed space for containing lubricant.

20. A coupling according to claim 19 wherein said last-mentioned pivotal mounting means for said first and second members comprises a ball-like member received in said intermediate member and providing a point of articulation for the pivotal movement of said first and second members in the confining cavities thereof.

21. A universal-type coupling for transmitting rotary movement between a pair of rotatable coupling elements comprising a first member in driving engagement with one of the coupling elements for rotation therewith, a second member in driving engagement with the other of said coupling elements for rotation therewith, and an intermediate member in engagement with said first and second members for transmitting rotary movement therebetween, said intermediate member having a pair of cavities in opposed peripheral portions, the central planes of each of said cavities being perpendicular to one another, said first member being received in one of said cavities of said intermediate member for relative movement therein with respect to said intermediate member along said plane of said cavity and for transmitting rotary movement between said first member and said intermediate member, said second member being received in the other of said cavities of said intermediate member for relative movement therein with respect to said intermediate member along said plane of said cavity and for transmitting rotary movement between said second member and said intermediate member, a ball member received in a third cavity in said intermediate member, means securing said first member to said ball member for conjoint movement therewith, means on said second member providing a socket in bearing contact with the exterior of said ball member for guiding said second member for pivotal movement about said ball member whereby said first and second members are pivotally movable relative to one another with the center of said ball member providing the point of articulation of such pivotal movement, said rotatable movement of said first and second members being confined by said pair of cavities.

22. A motion transmitting means comprising a first member having a pair of cavities in opposed peripheral portions, each of said cavities extending in a plane perpendicular to the plane of the other cavity, a pair of second members, each of said second members having a periphery defining a circle and a portion received within one of said cavities, said cavities and said second members providing contacting walls cooperating to confine the movement of said second members relative to said first member to movement in said planes of said cavities and to guide said second members for unlimited rotational movement so that the entire circumference of each of said second members is movable through said cavity receiving the same.

23. A motion transmitting means comprising a first member having a pair of cavities in opposed peripheral portions, each of said cavities extending in a plane perpendicular to the plane of the other cavity, a pair of second members, each of said second members having circular periphery throughout and a portion received within one of said cavities, said cavities and said second members providing contacting walls providing the only engagement between said first and second members and cooperating to confine the movement of said second members relative to said first member to movement in said planes of said cavities so that said second members are free to make a complete revolution about their central axes with the entire circumference of each of said second members being movable through said cavity receiving the same.

24. A motion transmitting means comprising a first member having a pair of cavities in opposed peripheral portions, each of said cavities extending in a plane perpendicular to the plane of the other cavity, a pair of second members having a circular periphery, each of said second members being received in one of said cavities, said cavities and said second members providing contacting walls cooperating to confine the movement of said second members relative to said first member in said planes of said cavities and to permit unlimited rotational movement of said second members so that each of said second members is movable through a complete revolution about an axis of rotation which passes through the center of curvature of its circular periphery and which extends perpendicularly to the plane of the cavity receiving the respective second member.

25. A motion transmitting means according to claim 24 wherein each of said cavities has a pair of spaced flat walls and a concave bottom having a radius of curvature substantially the same as that of said circular periphery of the second member received within the cavity whereby said cavity bottoms conform closely to said peripheries.

26. A motion transmitting means according to claim 24 comprising a plurality of said first members and a plurality of said second members being arranged alternately in engagement with each other for the transmission of rotary motion therebetween.

27. A motion transmitting means according to claim 26 comprising a flexible tubular sheath containing said first and second members and extending along the length of said motion transmitting means.

28. A motion transmitting means according to claim 26 wherein said first members have a ball-like configuration and said second members are flat discs.

29. A motion transmitting means according to claim 28 comprising a flexible tubular sheath containing said members and extending along the length of said motion transmitting means.

30. A motion transmitting means according to claim 24 wherein said second members have an annular configuration, said cavities being shaped to enclose said annular members an amount to provide interlocking engagement between said first member and said second members.

References Cited by the Examiner
UNITED STATES PATENTS

| | | | |
|---|---|---|---|
| 617,869 | 1/1899 | Vanderbeek | 64—16 |
| 710,798 | 10/1902 | Nowotny | 15—104.06 |
| 812,361 | 2/1906 | Pickles et al. | 15—104.06 |
| 1,693,778 | 12/1928 | Engman | 64—16 |
| 1,710,237 | 4/1929 | Ohlson | 64—2 |
| 1,866,714 | 7/1932 | King | 64—2 |
| 2,433,948 | 1/1948 | Good | 64—16 |

FOREIGN PATENTS

| | | |
|---|---|---|
| 11,895 | 5/1903 | Austria. |
| 764,335 | 3/1934 | France. |
| 1,165,664 | 6/1958 | France. |
| 120,858 | 5/1901 | Germany. |
| 139,721 | 4/1903 | Germany. |
| 19,017 | 4/1900 | Great Britain. |
| 589,513 | 6/1947 | Great Britain. |
| 971,401 | 9/1964 | Great Britain. |

DONLEY J. STOCKING, *Primary Examiner.*

HENRY F. RADUAZO, *Examiner.*